United States Patent Office 2,757,183
Patented July 31, 1956

2,757,183
CONTINUOUS MANUFACTURE OF AROMATIC ISOCYANATES

Carl F. Irwin, New Castle, and Frederic W. Swamer, Wilmington, Del., assignors to E. I. du Pont de Nemours & Company, Wilmington, Del., a corporation of Delaware No Drawing. Application August 14, 1952,
Serial No. 304,434

13 Claims. (Cl. 260—453)

This invention relates to the preparation of isocyanates, and more particularly to a continuous method of preparing isocyanates from aromatic amines and phosgene at temperatures above the boiling point of the isocyanate so formed.

Heretofore, one of the most convenient methods of preparing aromatic isocyanates was the direct reaction between phosgene and the selected aromatic amine in which the —NCO group is formed and HCl is split off. Unfortunately this method presents several difficulties, one of which is that the —NCO group is very reactive and readily reacts with the amine groups. In such a method, the aromatic isocyanate can react immediately with any of the free aromatic amine in the reaction mass. Part of this difficulty may be avoided by using the amine hydrochloride instead of the free amine, but in any event, the reaction is carried out as a batch process at a relatively low temperature which requires a rather extended period of time. If elevated temperatures are used to shorten the time of reaction, undesirable by-products and tars are formed.

Vapor phase methods have also been proposed, but these give low yields and likewise produce tars.

In U. S. 2,480,088 a process is disclosed for reacting primary amines with phosgene to produce a carbamyl chloride which is subsequently decomposed in a separate step into the corresponding isocyanate. The yields of this process are relatively low.

Another method for a continuous process involves a cascade system in which an amine or its hydrochloride is treated in a solvent with phosgene at progressively increased temperatures in successive reaction vessels. This method, however, has the disadvantage that considerable space is required for the several vessels with their attendant supervision. The yields obtained in this process, however, are also low, being substantially the same as those obtained in the conventional batch method.

It is therefore an object of the present invention to provide a method for preparing aromatic isocyanates by a continuous method with improved yields. Another object is the preparation of isocyanates with a minimum of undesirable by-products and tars. A still further object is the provision of a method of preparing aromatic isocyanates by a continuous method using a single reaction vessel. Other objects will appear as the description of the invention proceeds.

These and other objects are obtained by reacting an aromatic amine or its hydrochloride dissolved or suspended in an inert liquid, having a boiling point above that of the aromatic isocyanate to be formed, at a temperature above the boiling point of the said aromatic isocyanate, but below the boiling point of the solvent, with phosgene, by passing the same into the solution or suspension and recovering the desired aromatic isocyanate from the vapor phase. The process is relatively simple, and may be carried out in a reaction vessel which can be heated to the desired temperature and is provided with an agitator, such as a vaned disc type, to insure thorough distribution of the phosgene gas. The vessel should be further provided with an inlet tube which dips below the surface of the liquid for introducing the gas, and also an inlet tube for the liquid feed and an outlet for conducting the vapors to a receiver. The latter is charged with a solvent which dissolves the aromatic isocyanate and is held at a temperature sufficiently high to prevent the formation of carbamyl chloride by reaction of the isocyanate with the HCl formed in the reaction. At this temperature the solubility of phosgene and HCl in the solvent is at a minimum. The receiver is provided with a reflux condenser which returns solvent while passing through the phosgene and HCl which are absorbed in a suitable system.

In operation with a free amine, a solvent having a boiling range of about 350–400° C., for example, is charged into the reaction vessel and heated to a point several degrees above the boiling point of the aromatic isocyanate to be prepared. The amine is then dissolved in a lower boiling chlorinated aromatic solvent which is preferably the same as that used in the receiver, and is fed into the reaction vessel below the surface of the liquid. Simultaneously, there is introduced a stream of phosgene beneath the surface of the reaction mass. The aromatic isocyanate is formed with the liberation of HCl. Since the temperature of the reaction mass is above the boiling point of the isocyanate, the latter vaporizes immediately and passes to the receiver together with the hydrogen chloride and excess phosgene. The isocyanate condenses in the vapor and liquid of the solvent in the receiver and the hydrogen chloride and phosgene pass out through the reflux condenser to a scrubber system.

In the preferred embodiment of the invention, the solvent used for the amine also boils below the temperature in the reaction vessel so that it also distills over into the receiver and does not accumulate in the reaction vessel. It will be apparent that this method has the advantage of removing the isocyanate immediately from the reaction zone so that it does not have an opportunity to react with the parent amine, and when simpler amines are used the conversion to the corresponding isocyanate is practically quantitative. With the diisocyanates, yields are also very high and are from 20–25% higher than the prior art processes mentioned above.

If an amine hydrochloride is used, it may be formed in a solvent by passing hydrogen chloride into the solvent solution of the amine. Normally, the amine hydrochloride will be insoluble in the solvent and will be fed to the reaction mass as a slurry. One variation of this method consists in suspending a quantity of amine hydrochloride in the solvent in the reaction vessel and feeding in the phosgene continuously. Additional amine hydrochloride is introduced as necessary. The solvent for the reaction is preferably a high boiling hydrocarbon fraction or a chlorinated aromatic hydrocarbon fraction. Any such solvent may be used such as higher boiling paraffinic, naphthenic or aromatic hydrocarbons, provided it is inert to the reactants and products and withstands their action at the temperatures involved without substantial change. The boiling point of the solvent will depend on the boiling point of the isocyanate to be formed and the reaction temperature used. Thus, the boiling point of the solvent need be only some 20–50° C. higher than the reaction temperature although it may be higher. Generally speaking, the boiling point will be not lower than about 180 C. Hydrocarbon fractions derived from petroleum or other sources are suitable. Thus paraffinic fractions, such as paraffin waxes, or naphthenic fractions are suitable. Aromatic hydrocarbons derived directly or indirectly from petroleum or coal tar are also suitable, for example, p-diphenylbenzene, diphenylmethane and triphenylmethane are typical of suitable aromatic hydrocarbons. The aromatic hydrocarbons may be chlorinated to raise their boiling points and such chlorinated aromatic hydrocarbons are quite suitable. The extent of chlorination is not critical. Generally, chlorinated paraffin hydrocarbons are not sufficiently stable under the conditions of reaction and are unsuitable for use. The principal criterion, outside of the boiling range, is that the solvent should be essentially unreactive with phosgene, hydrogen chloride, the amine, and the isocyanate and also be thermally stable at the temperature of the reaction. The preferred chlorinated hydrocarbons are the chlorinated biphenyls such as those sold under the trade name "Aroclor" and the chlorinated benzenes. The preferred aliphatic hydrocarbons are those higher boiling naphthenic fractions derived from asphaltic crude oils. In the preparation of low boiling isocyanates such as phenyl isocyanate, simple chlorinated hydrocarbons such as trichlorobenzene may be used as solvents. The solvent for the amine and for collecting the aromatic isocyanate formed may also be chlorinated aromatic hydrocarbons, but usually of lower chlorine content such as monochlorobenzene or o-dichlorbenzene, but this solvent preferably should boil in such a range that it distills over with the isocyanate.

The temperature limits are not critical, since it is only necessary that the temperature of the reaction solvent be a few degrees higher than the boiling point of the isocyanate to be formed. Higher temperatures are not preferred, since they require more heating and may lead to undesirable side reactions. A practical range is from 1–20° C. above the boiling point of the isocyanate. It will be apparent, however, that if the temperature is too near the boiling point of the solvent, an undesirably large amount of the reaction solvent will distill over into the receiver. The preferred temperature of operating the reaction is from about 100–300° C. Higher temperatures are not preferred, since some decomposition of the isocyanate may take place. In general, the decomposition point of the particular isocyanate will determine the upper temperature limit beyond which the yields are sharply reduced.

The solvent in the receiver is generally kept sufficiently hot to reflux gently. It appears that the vapor of the solvent tends to dissolve the vapor of the aromatic isocyanate and condenses it in the solvent, and hence, in its selection, due consideration should be given to this solvent power and its boiling point to prevent the formation of an aromatic carbamyl chloride by reaction of the isocyanate and HCl.

After all the amine has been added to the reaction solvent, the passage of phosgene is continued for a short time to complete the reaction with any unconverted amine. Dry nitrogen is then passed through the system to remove any dissolved hydrogen chloride and phosgene. The isocyanate is then recovered by distilling off the solvent and fractionating the aromatic isocyanate. The reaction is usually carried out at atmospheric pressure. However, reduced pressure may be used to lower the boiling points of the isocyanates which have a tendency to decompose.

The following examples are given by way of illustration, but no limitation is placed thereon, since other reactants and solvents as disclosed above may be used.

*Example I*

Into a heated reaction vessel equipped with an agitator, thermometer, gas inlet, a liquid inlet tube and a take-off condenser was charged 450 parts of a chlorinated polyphenyl such as that sold by Monsanto Chemical Co. as "Aroclor" No. 1260 having a boiling range of 385–420° C. The temperature was adjusted to 260° C. Into this was fed a solution of 16 parts of 2,4-tolylene diamine in 260 parts of o-dichlorobenzene through the liquid inlet tube which dipped below the surface of the chlorinated polyphenyl. The time of addition was 50 minutes and the reaction mass was agitated and the temperature was held at 255–265° C. during this time. Simultaneously there was added to the reaction mass 60 parts of phosgene at a uniform rate over the 50 minute period through the gas inlet tube which also dipped below the surface of the liquid.

The 2,4-tolylene diisocyanate was immediately distilled out of the reaction mass as it formed, along with the o-dichlorobenzene, and was condensed and collected in a receiver where the temperature was maintained at 180–185° C. to prevent the formation of the corresponding carbamyl chloride. The HCl formed in the reaction passed over with the diisocyanate and o-dichlorobenzene and was removed from the receiver through a reflux condenser attached to the receiver. The temperature of 180–185° C. in the receiver was sufficient to maintain a gentle reflux which minimized the solubility of the HCl in the solution.

After all the 2,4-tolylene diamine had been added, the phosgene flow was continued for an additional 20 minutes while the temperature of the reaction mass was maintained at 255–265° C. When the phosgene flow was discontinued, nitrogen was passed through the refluxing solution in the receiver to remove any residual amounts of HCl and phosgene. The o-dichlorobenzene was then distilled off the material collected in the receiver and the recovered 2,4-tolylene diisocyanate was fractionated under 4 mm. pressure at 80–85° C. The yield was 20.5 parts or 88.5% of theory.

Instead of the free 2,4-tolylene diamine, the dihydrochloride may be used. Since it is insoluble in the o-dichlorobenzene, the addition at a uniform rate is rather difficult. However, the reaction proceeds smoothly and yields on the order of 85–90% of 2,4-tolylene diisocyanate are obtained.

*Example II*

Into the reaction flask of equipment as described in Example I was charged 850 parts of o-dichlorobenzene and 50 parts of monochlorobenzene and into the receiver was charged 400 parts of monochlorobenzene. A stream of dry nitrogen was passed through the gas inlet tube and the reactor was heated until traces of water were distilled out. The receiver was also heated simultaneously until traces of water were similarly removed. The solvents were then cooled to below 100° C.

Into the reaction flask was charged 102 parts of aniline and gaseous HCl was passed in through the gas inlet tube while the solution was stirred and held at 100–120° C. When all of the aniline had been converted to the hydrochloride, as judged by the non-absorption of HCl, the flow was stopped. With the temperature at 120° C. a flow of phosgene at the rate of 60–70 parts per hour was started through the gas inlet tube. The temperature was gradually increased to 180° C. over a period of 1.5 hours and maintained there. Phenyl isocyanate (boiling point 166° C.) was formed and immediately distilled over into the receiver with some o-dichlorobenzene. The receiver was held at approximately 130° C., at which temperature the monochlorobenzene refluxed gently. The phenylisocyanate condensed in the monochlorobenzene. Since the dissociation temperature of phenyl carbamyl chloride is about 110° C. the phenylisocyanate did not form the carbamyl chloride, and the HCl and excess phosgene passed out through the condenser. This procedure was continued for 2 hours, after the operating temperature had been reached. During the last 20 minutes the reaction flask was held at 200° C. while most of the o-dichlorobenzene distilled over into the receiver.

The product in the receiver was refluxed gently for 45 minutes while a stream of nitrogen was passed through to remove residual HCl and phosgene. The yield of phenylisocyanate was 122.5 parts which is a 93% yield based on the aniline charged.

Example III

Using the equipment of Example I, there were charged into the reaction flask 200 parts of trichlorobenzene and 50 parts of monochlorobenzene and into the receiver was placed 200 parts of monochlorobenzene. The system was dried out by the procedure of Example II. The reactor was heated to 180° C. and phosgene at a rate of 50 parts per hour was passed through for 15 minutes. Then a solution of 45 parts of aniline in 290 parts of dry monochlorobenzene was added at a uniform rate through the liquid inlet tube below the surface of the reaction mass over a period of 2.75 hours. The flow of phosgene was maintained and the temperature was held at 180–190° C. Phenylisocyanate was formed and distilled over into the receiver, which was held at 130° C., along with monochlorobenzene and some trichlorobenzene. After all the aniline was added the temperature was raised to 212° C. over a period of 40 minutes.

The flow of phosgene was stopped and nitrogen was passed through the gently refluxing receiver for 30 minutes to remove HCl and phosgene. From the receiver, 56.5 parts of phenylisocyanate was recovered which is a yield of 98% of theory.

Example IV

The equipment of Example I was used. Into the reaction flask was charged 450 parts of a commercially available chlorinated polyphenyl (sold by Monsanto Chemical Co. as "Aroclor" 1262) with a boiling range of 400–430° C. and 100 parts of o-dichlorobenzene was placed into the receiver. The reaction solvent was heated to 250° C. while passing in phosgene at a rate of 50 parts per hour for about 30 minutes. There was then introduced through the liquid inlet tube a solution of 22 parts of m-phenylene diamine in 258 parts of o-dichlorobenzene over a period of 2 hours. The flow of phosgene was maintained at 100 parts per hour and the reactor temperature was held at 245–250° C. The receiver was maintained at 180–185° C. to cause a gentle reflux. The m-phenylene diisocyanate distilled over into the receiver along with some o-dichlorobenzene.

During the addition of the amine solution it was noticed that a small reddish-black granular deposit built up around the liquid inlet tube. So after the solution was all added a second solution of 22 parts of m-phenylene diamine in 200 parts of o-dichlorobenzene with an added 22 parts of the chlorinated polyphenyl as used in the reactor was made up and run into the flask over a period of 1.5 hours while the temperature was maintained at 240–245° C., the phosgene flow remaining at 100 parts per hour. No deposit was formed on the end of the inlet tube.

The phosgene flow was then continued for an additional 45 minutes, and then nitrogen was passed through the gently refluxing receiver for 30 minutes to remove HCl and phosgene. The solvent was removed by distillation at 50 mm. pressure and the crude m-phenylene diisocyanate was fractionated to yield 46 parts of m-phenylene diisocyanate boiling at 95–100° C. at 8 mm. This is a yield of 71% of theory.

Example V

Following the procedure of Example II, 1200 parts of trichlorobenzene and 50 parts of toluene were charged into the reactor and 200 parts of monochlorobenzene were placed in the receiver. The system was dried as in Example II. 102 parts of p-chloroaniline were added to the reaction flask, and it was heated to 100–120° and a slow stream of gaseous HCl was passed in for 6 hours to convert the aniline to the hydrochloride. The temperature was increased to 130° C. and phosgene was passed into the gas inlet tube at a rate of 65 parts per hour for 30 minutes. The reaction mass was then heated to 200° C. and held at 200–218° C. for 2 hours and 40 minutes while the flow of phosgene was maintained at the same rate. p-Chlorophenyl isocyanate was formed and distilled over into the receiver along with some of the trichlorobenzene. The receiver was maintained at a gentle reflux at about 130° C.

The phosgene flow was stopped and nitrogen was passed through the gently refluxing solution in the receiver to remove HCl and phosgene. There was recovered 109 parts of p-chlorophenyl isocyanate which is 89% of the theoretical yield.

Example VI

Into the reaction flask of the apparatus of Example I was charged 300 parts of a highly acid-washed naphthenic hydrocarbon fraction having a Saybolt Universal viscosity of 353 seconds at 100° F., a specific gravity of 0.8799 at 60° F., and distillation range of 151° C. to 280° C. at a pressure of 5 mm. Into the receiver was placed 200 parts of o-dichlorobenzene. The system was purged with dry nitrogen and then the reaction flask was gradually heated to 260° C., while a slow stream of phosgene was passed thru to saturate the system. The receiver was held at 180–185° C., during this time. Then the flow of phosgene was increased and held at 100 parts per hour while there was simultaneously fed into the oil in the reaction flask, a solution of 50 parts of m-tolylene diamine and 30 parts of the same naphthenic oil as used in the reaction flask dissolved in 500 parts of o-dichlorobenzene at a uniform rate over a period of 2.25 hours. The temperature of the reaction flask was held at 260–275° C. during this time. After all the amine had been added, phosgene was continued thru the reaction flask for an additional 20 minutes and the temperature was held at 280° C. to remove any residual isocyanate. Nitrogen was then passed thru the receiver to remove dissolved phosgene and hydrogen chloride. The o-dichlorobenzene was distilled from the product in the receiver and 65 parts of 2,4-tolylene diisocyanate was recovered representing a yield of 89% of theory.

While the invention has been illustrated by the use of such aromatic amines as 2,4-tolylene diamine, aniline, m-phenylene diamine, and chloroaniline, it is to be understood that any primary aromatic amine such as o- or p-phenylene diamine, o-, m-, or p-aminotoluene, other tolylene diamines and their addition salts are operable in the process. In general those amines which form isocyanates boiling below about 300° C. at atmospheric pressure are operable. They may have alkyl or halogen substituents in the aromatic ring but should be devoid of groups that are reactive with isocyanate groups such as —OH, —SH, —COOH, —CONH$_2$, —SONH$_2$, etc. The higher boiling isocyanates may be prepared by operating under reduced pressure, in which case a higher boiling solvent will of course be required. In the claims the term "amine" is intended to include either the free amines or their salts such as their hydrochlorides.

It will be apparent that the present invention offers several advantages over the prior art, primarily in the yields obtaineds. Another advantage is that the reaction proceeds gently in a continuous manner and requires a minimum of apparatus and supervision.

It will be apparent that many widely different embodiments of this invention may be made without departing from the spirit and scope thereof, and therefore it is not intended to be limited except as indicated in the appended claims.

We claim:

1. The process of preparing aromatic isocyanates which comprises adding a primary aromatic amine in a chlorinated hydrocarbon to a non-reacting liquid maintained at a temperature above the boiling point of the aromatic isocyanate formed but below the boiling point of the non-reacting liquid, simultaneously introducing phosgene into the non-reacting liquid, and drawing off the isocyanate in its vapor form substantially as fast as it is formed.

2. The process of claim 1 in which the liquid is a naphthenic hydrocarbon fraction.

3. The process of claim 1 in which the liquid is a halogenated aromatic hydrocarbon.

4. The process of claim 1 in which the boiling range of the liquid is about 180–420° C.

5. The process of claim 1 in which the liquid is a chlorinated biphenyl having a boiling range of about 385–420° C.

6. The process of claim 1 in which the reaction is carried out between about 100° C. and 300° C.

7. The process of claim 1 in which the temperature of the reaction mass is from about 10–20° above the boiling point of the isocyanate formed.

8. The process of claim 1 in which the amine is 2,4-tolylene diamine.

9. The process of claim 1 in which the amine is aniline in the form of its hydrochloride.

10. The process of claim 1 in which the amine is m-phenylene diamine.

11. The process of claim 1 in which the amine is p-chloroaniline.

12. The process of claim 2 in which the isocyanate vapor, after removal from the reaction zone, is refluxed and condensed in a solvent, the boiling point of the said solvent being above the temperature at which an aromatic carbamyl chloride forms.

13. The process of preparing aromatic diisocyanates having a boiling point below 385° C. which comprises adding a primary aromatic diamine in a chlorinated hydrocarbon, and phosgene simultaneously to a body of chlorinated biphenyl having a boiling range of about 385–428° C. maintained at a temperature above the boiling point of the aromatic diisocyanate formed but below the boiling point of the chlorinated diphenyl, collecting the aromatic diisocyanate which distills from the reaction mass, refluxing and condensing the said aromatic diisocyanate vapors in a receiver maintained at about 180–185° C. until any unreacted phosgene and hydrogen chloride is removed, and thereafter recovering the relatively pure aromatic diisocyanate.

References Cited in the file of this patent

UNITED STATES PATENTS

| | | |
|---|---|---|
| 2,218,030 | Pohls et al. | Oct. 15, 1940 |
| 2,326,501 | Siefken et al. | Aug. 10, 1943 |
| 2,625,561 | Werntz | Jan. 13, 1953 |
| 2,680,127 | Slocombe et al. | June 1, 1954 |
| 2,680,129 | Flores | June 1, 1954 |
| 2,680,130 | Flores | June 1, 1954 |